United States Patent
Hunter et al.

(10) Patent No.: US 7,075,567 B2
(45) Date of Patent: Jul. 11, 2006

(54) METHOD AND APPARATUS FOR CONTROLLING A PLURALITY OF IMAGE CAPTURE DEVICES IN A SURVEILLANCE SYSTEM

(75) Inventors: Andrew Arthur Hunter, Bristol (GB); Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 10/194,237

(22) Filed: Jul. 15, 2002

(65) Prior Publication Data

US 2003/0025800 A1   Feb. 6, 2003

(30) Foreign Application Priority Data

Jul. 31, 2001   (GB)   ................................. 0118596.6

(51) Int. Cl.
*H04N 5/228*   (2006.01)

(52) U.S. Cl. .............................................. 348/208.13

(58) Field of Classification Search ................ 348/153, 348/154, 208.13
See application file for complete search history.

(56) References Cited

U.S. PATENT DOCUMENTS

| | | | | |
|---|---|---|---|---|
| 5,164,827 A * | 11/1992 | Paff | ............................. | 348/143 |
| 5,602,585 A * | 2/1997 | Dickinson et al. | .......... | 348/155 |
| 6,215,319 B1 * | 4/2001 | Hafer et al. | ................. | 324/679 |
| 6,216,519 B1 | 4/2001 | Hartung et al. | | |
| 6,269,174 B1 * | 7/2001 | Koba et al. | .................. | 382/107 |
| 2002/0054211 A1 * | 5/2002 | Edelson et al. | ............. | 348/169 |

FOREIGN PATENT DOCUMENTS

| | | |
|---|---|---|
| EP | 0714081 A1 | 5/1996 |
| EP | 0889452 A2 | 1/1999 |
| EP | 0 979 009 A2 | 2/2000 |

* cited by examiner

*Primary Examiner*—David Ometz
*Assistant Examiner*—James M. Hannett
(74) *Attorney, Agent, or Firm*—Foley & Lardner LLP

(57) ABSTRACT

A method and apparatus for controlling the operation of a system having a plurality of video cameras. The cameras are linked to a control unit which has a motion detection apparatus for monitoring the images received from the cameras and detecting motion therein. The cameras are adapted to operate in at least two modes: a low resolution mode and a high resolution mode. Under normal circumstances, cameras will be operating in low resolution mode to minimize use of system resources. If activity is detected within the field of view of one of the cameras, that camera is switched to high resolution, the other cameras remaining in the low resolution mode.

16 Claims, 3 Drawing Sheets

METHOD AND APPARATUS FOR CONTROLLING A PLURALITY OF IMAGE CAPTURE DEVICES IN A SURVEILLANCE SYSTEM

FIELD OF THE INVENTION

This invention relates to a method and apparatus for controlling multiple image capture devices and, in particular, to a method and apparatus for controlling the status of a plurality of image capture devices in a system, such as a surveillance system or the like.

BACKGROUND OF THE INVENTION

It is well known to provide within a building or similar enclosure a plurality of image capture devices mounted or otherwise placed at various key locations so as to provide a surveillance system for monitoring and/or capturing unauthorised activities within the building or enclosure.

In its simplest form, such a surveillance system comprises a plurality of image capture devices, such as cameras for capturing still or (more commonly) moving images, each of which is linked or connected to a respective display screen or monitor on which the images captured by the devices can be viewed. Thus, a typical system would have a plurality of monitors located at a central position for simultaneous viewing of the images captured by each of a plurality of image capture devices.

However, such systems are somewhat inefficient in the sense that many (if not all) of the images captured by the devices will be of little or no interest to the viewer for much of the time as no unauthorised activities will be taking place within their respective fields of view. In fact, it is most likely that unauthorised activities, if any, will be taking place within the field of view of only a single image capture device at any one time, making the rest of the image capture devices (and their respective monitors or screens) redundant. Further, it can be quite difficult for a single viewer to monitor the content of images being displayed on several different monitors at the same time, thereby giving rise to the possibility that any unauthorised activities would be missed.

In another known system, a plurality of cameras are linked or connected to a single monitor, the monitor displaying the images captured by each of the cameras for a predetermined time in a predetermined order. This is obviously undesirable as any unauthorised activities may be taking place within the field of view not currently being displayed on the monitor or screen, again increasing the possibility that such activities will go undetected. A variation of this type of system comprises a plurality of cameras being connected to a single viewing means, such viewing means being arranged to monitor incoming images, detect movement therein and display the images from the device within whose field of view the movement is detected. However, the continuous transmission of images captured by a plurality of image capture devices requires a transmission bandwidth, storage capacity and power consumption which is in many cases unacceptably high.

U.S. Pat. No. 5,602,585 describes a motion detection camera system which may be used as a security camera and includes an active pixel imaging system operable in a video and differential mode connected to a mode activation circuit that controls the imaging system mode. In the video mode, the imaging system generates an output signal containing information of a viewed area in a frame-by-frame manner. In the differential mode, the imaging system generates a differential output signal containing information consisting of the differences in the viewed area between adjacent detected frames. Normally, the imaging system camera is operated in the differential mode. If no motion occurs in the viewed area, the corresponding differential output signal representing the interframe differences will have a constant signal level. Upon detecting that the differential output signal deviates by greater than a threshold level, thereby indicating motion in the viewed area, the mode activation circuit causes the imaging system to operate in its video mode. The corresponding generated video output signal of the imaging system is then provided to monitoring equipment, such as a video cassette recorder for recording of the motion in the viewed area.

Thus, in the type of system described above, video images are only transmitted to the monitoring equipment if motion is detected within the field of view of the camera. However, as the motion detection circuitry is included within the camera, it can only control the resultant output from that camera and, as such, for a plurality of cameras in a multi-camera surveillance system, individual motion detection and mode activation circuits would have to be provided for each camera. Further, if the movement is taking place between the fields of view of a plurality of cameras, any time delay between the movement being detected and the respective camera being arranged to operate in its video mode would cause at least some, if not all, of the apparent activity to go undetected.

European Patent Application Number EP-A-0979009 describes a camera which normally transmits captured images to a viewing area in the form of low resolution (or highly compressed) image data. At the same time, a high resolution (i.e. less compressed) for of the image data is stored locally by the camera. The camera includes a control unit which can be used to monitor captured images and detect any unusual conditions therein, for example, motion of an object or entity, and transmit a signal to the viewing area alerting the user of the occurrence of such a condition. The user can, if required, retrieve the high resolution data for viewing upon request. Thus, the camera is always generating two sets of image data: a low resolution version for transmission across a wireless link, and a high resolution version for local storage and retrieval for viewing at a later time, if requested manually by the user. The generation of two sets of data representing the same images is obviously inefficient, and often unnecessary in the sense that the high resolution data is only likely to be required for viewing in the event of an unusual condition being detected. Further, the high resolution image data cannot be viewed in real time.

We have now devised an arrangement which overcomes the problems outlined above.

SUMMARY OF THE INVENTION

In accordance with the present invention, there is provided control apparatus for receiving outputs from and controlling the operation of a plurality of image capture devices, at least some of said image capture devices being arranged to operate at any time in only one of at least two modes, the transmission bandwidth required to accommodate the outputs of image capture devices operating in the second mode being substantially less than that required to accommodate the outputs of image capture devices operating in the first mode, wherein all of the image capture devices are arranged, in use, to continuously transmit captured image data to the control apparatus, the control apparatus comprising monitoring apparatus for monitoring the outputs from one or more of said plurality of image capture devices, detection apparatus for detecting activity within the field of view of at least one of said image capture devices, and switching apparatus for switching or maintaining the operating mode of the image capture device within whose field of view activity is detected to the first operating mode, the image capture devices having fields of view within which no activity is taking place being arranged or caused to operate in said second operating mode.

In a further aspect, the present invention provides control apparatus for receiving outputs from and controlling the operation of a plurality of image capture devices, at least some of said image capture devices being arranged to operate in one of at least two modes, the transmission bandwidth required to accommodate the outputs of image capture devices operating in the second mode being substantially less than that required to accommodate the outputs of image capture devices operating in the first mode, the control apparatus comprising monitoring apparatus for monitoring the outputs from one or more of said plurality of image capture devices, detection apparatus for detecting activity within the field of view of at least one of said image capture devices, tracking apparatus for tracking the progress of said activities so as to determine when the occurrence of said activity has or will exit the field of view of said at least one image capture device, prediction apparatus for predicting which image capture devices field of view said activity will subsequently enter, and switching apparatus for switching or maintaining the operating mode of the image capture device within whose field of view activity is detected or predicted to the first operating mode, the image capture devices having fields of view within which no activity is detected or predicted being arranged or caused to operate in said second operating mode.

Also in accordance with the present invention, there is provided a method of controlling the operation of a plurality of image capture devices, at least some of said image capture devices being arranged to operate at any time in only one of at least two modes, the transmission bandwidth required to accommodate the outputs of image capture devices in the second mode being substantially less than that required to operate image capture devices in the first mode, the method comprising the steps of providing monitoring apparatus for monitoring the outputs from said plurality of image capture devices, continuously transmitting captured image data from all of said image capture devices to said monitoring apparatus, detecting activity within the field of view of at least one of said image capture devices, and switching or maintaining the operating mode of the image capture device within whose field of view activity is detected to the first operating mode, the image capture devices having fields of view within which no activity is taking place being arranged or caused to operate in said second operating mode.

In a further aspect, the present invention provides a method of controlling the operation of a plurality of image capture devices, at least some of said image capture devices being arranged to operate in one of at least two modes, the transmission bandwidth required to accommodate the outputs of image capture devices operating in the second mode being substantially less than that required to accommodate the outputs of image capture devices operating in the first mode, the method comprising the steps of monitoring the outputs from said plurality of image capture devices, detecting activity within the field of view of at least one of said image capture devices, tracking the progress of said activity so as to determine when the occurrence of said activity has or will exit the field of view of said at least one image capture device, predicting which image capture devices field of view said activity will subsequently enter, and switching or maintaining the operating mode of the image capture devices within whose field of view activity is detected or predicted to the first operating mode, the image capture devices having fields of view within which no activity is detected or predicted being arranged or caused to operate in said second operating mode.

In a preferred embodiment of the second aspect of the present invention, all of the image capture devices continuously transmit their outputs to the control apparatus so that it can detect and monitor activity in their fields of view. This, of course, eliminates the need for additional detectors associated with each of the image capture devices. However, in order to minimise the bandwidth required to support the transmission of multiple outputs from the devices, it is preferred that the control apparatus be arranged to control the image capture devices such that they normally operate in a low resolution, low frame rate, monochrome mode (as opposed to odour) etc. (which require substantially less bandwidth than high resolution, high frame rate or colour modes), and only switch the mode of an image capture device to high resolution, high frame rate or colour operation (first operating mode) in the event that activity is detected within their field of view. As the progress of the activity is tracked and it exits that image capture device's field of view, its mode is switched back to the normal low resolution or monochrome mode, and the image capture device whose field of view the activity is predicted to enter is switched from low to high resolution or monochrome to colour operation for the time during which the activity takes place within its field of view.

It will be appreciated that, in order to track the progress of the detected activity between the fields of views of a plurality of image capture devices, the control apparatus should preferably include details of the arrangement of the image capture devices relative to each other. This may be achieved explicitly by programming the control apparatus with the coordinates (relative or otherwise) indicating the relative (or actual) positions of the image capture devices. However, in its simplest form, the control apparatus could simply be programmed with the number of image capture devices within the system and told that they are equal distances apart within a predetermined area. The preferred tracking mechanism is described in detail in the applicant's copending British Patent Application No. 0026198.2 filed on 26 Oct. 2000 entitled "Optimal Image Capture", the contents of which are incorporated by reference herein.

It will be appreciated that one of the significant advantages of the first aspect of the invention is the ability to provide a single (unitary or distributed) control apparatus to control the operation of a plurality of cameras, as opposed to the cameras each controlling their own operation.

It will be appreciated that the control apparatus may comprise a central control unit for controlling the operation of all of the image capture devices, or it may comprise a distributed control arrangement (i.e. local to each of the image capture devices) which provides direct camera-to-camera signalling to prepare cameras for predicted activity in their fields of view. Thus, each camera would comprise means for determining which camera's field of view the detected activity is predicted to move into and signalling that camera accordingly, thereby causing it to switch to the first operating mode in preparation.

The control apparatus may be arranged to trigger an alarm or other type of alert mechanism in the event that an activity is detected within a protected area and/or if such an activity continues for more than a predetermined period of time. In one embodiment of the invention, the control apparatus may be in the form of an ethernet arrangement (or the like), which is well known in the art as a system of communication for local area networks (and the like), usually by means of coaxial cable or the like, which prevents or otherwise controls simultaneous transmission by more than one station (in this case, image capture device).

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
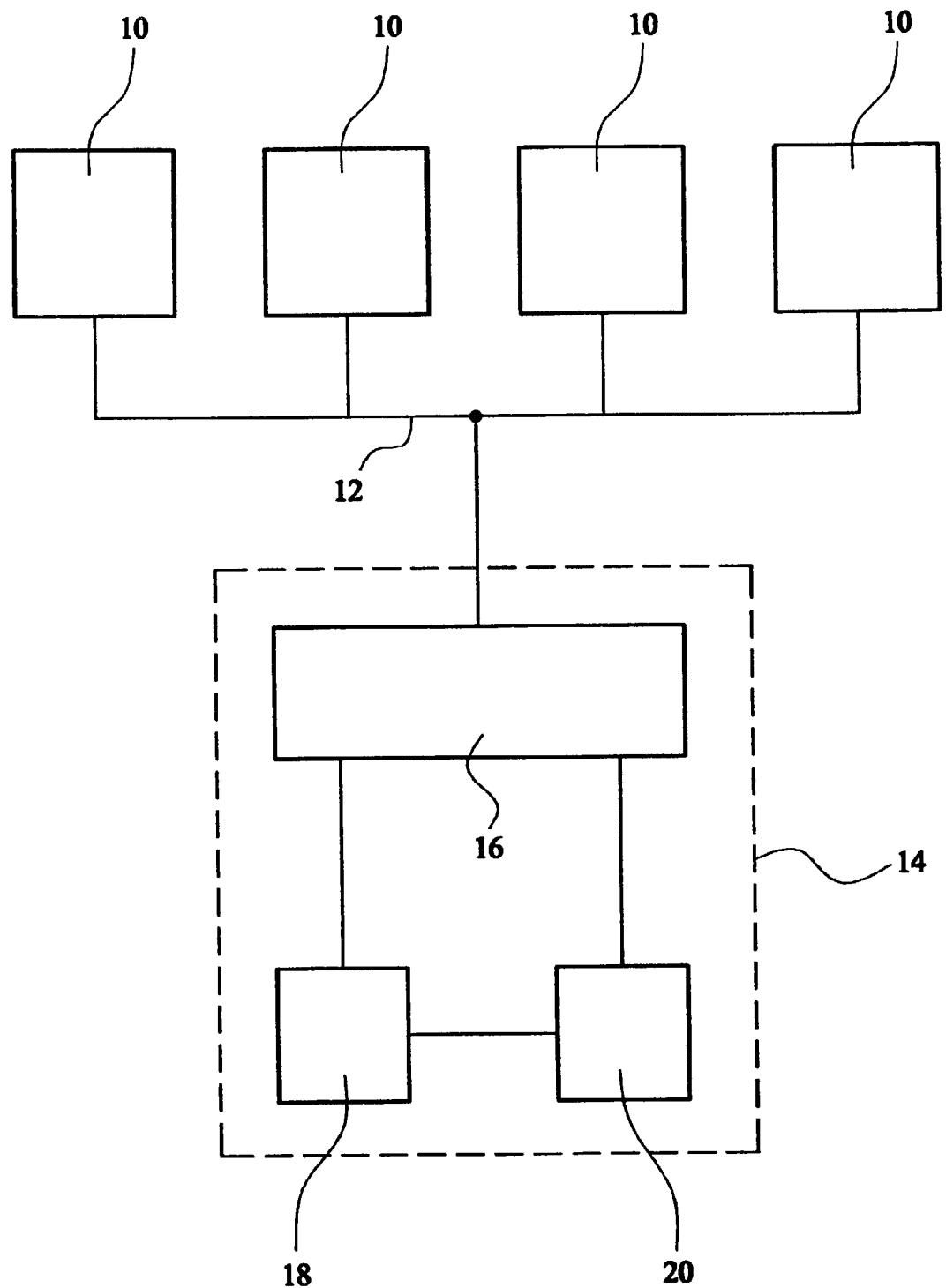
FIG. 1 is a schematic block diagram of an exemplary embodiment of the present invention.

Referring to FIG. 1 of the drawings, a surveillance system according to an exemplary embodiment of the present invention comprises a plurality of video cameras 10 mounted or otherwise placed in spaced apart relation within an area to be monitored. In a preferred embodiment, the cameras 10 are positioned such that the edges of the fields of view of adjacent cameras are either immediately next to each other (i.e. with little or no gap) or even slightly overlap to prevent "blind spots".

The cameras 10 are linked (either by hard wired connections 12 or wireless links) to an ethernet-based control unit 14. The control unit 14 includes an interface 16 for receiving the outputs from the cameras 10 and sending signals to the cameras to alter their operating mode, as necessary.

The control unit 14 further comprises a motion detection apparatus 18 for monitoring the images received from the cameras 10 and detecting motion therein. In one embodiment of the present invention, the motion detection apparatus 18 may be arranged to compare corresponding pixels within adjacent frames of each camera output and detect interframe differences (greater than a predetermined threshold) to indicate activity within the field of view of a particular camera 10.

The cameras 10 are adapted to operate in at least two modes: a low resolution mode in which they transmit low resolution images captured within their field of view, and a high resolution mode in which they transmit high resolution captured images. In one embodiment of the invention 'low resolution' may be around half of 'high resolution'. Under normal circumstances, the cameras 10 having fields of view within which no activity is determined to be taking place will be operating in low resolution mode to minimise power consumption, storage consumption and transmission bandwidth of the system. In the event that the control unit 14 detects activity within the field of view of one of the cameras 10, it transmits a signal to that particular camera to switch its mode to high resolution, the other cameras 10 remaining in the low resolution mode.

The control unit 14 further comprises tracking apparatus 20 for monitoring the activity within the initial field of view and for predicting which field of view the activity will move into as it moves out of the initial field of view. In response to such prediction, the control unit 14 sends a signal to the camera 10 whose field of view the activity is predicted to move into, switching its mode to high resolution. Once the activity has left the initial field of view, the mode of that respective camera 10 is switched back to low resolution (either automatically because the mode of another camera has switched to high resolution, or as a result of receipt of another signal from the control unit 14.

Figure 2A:
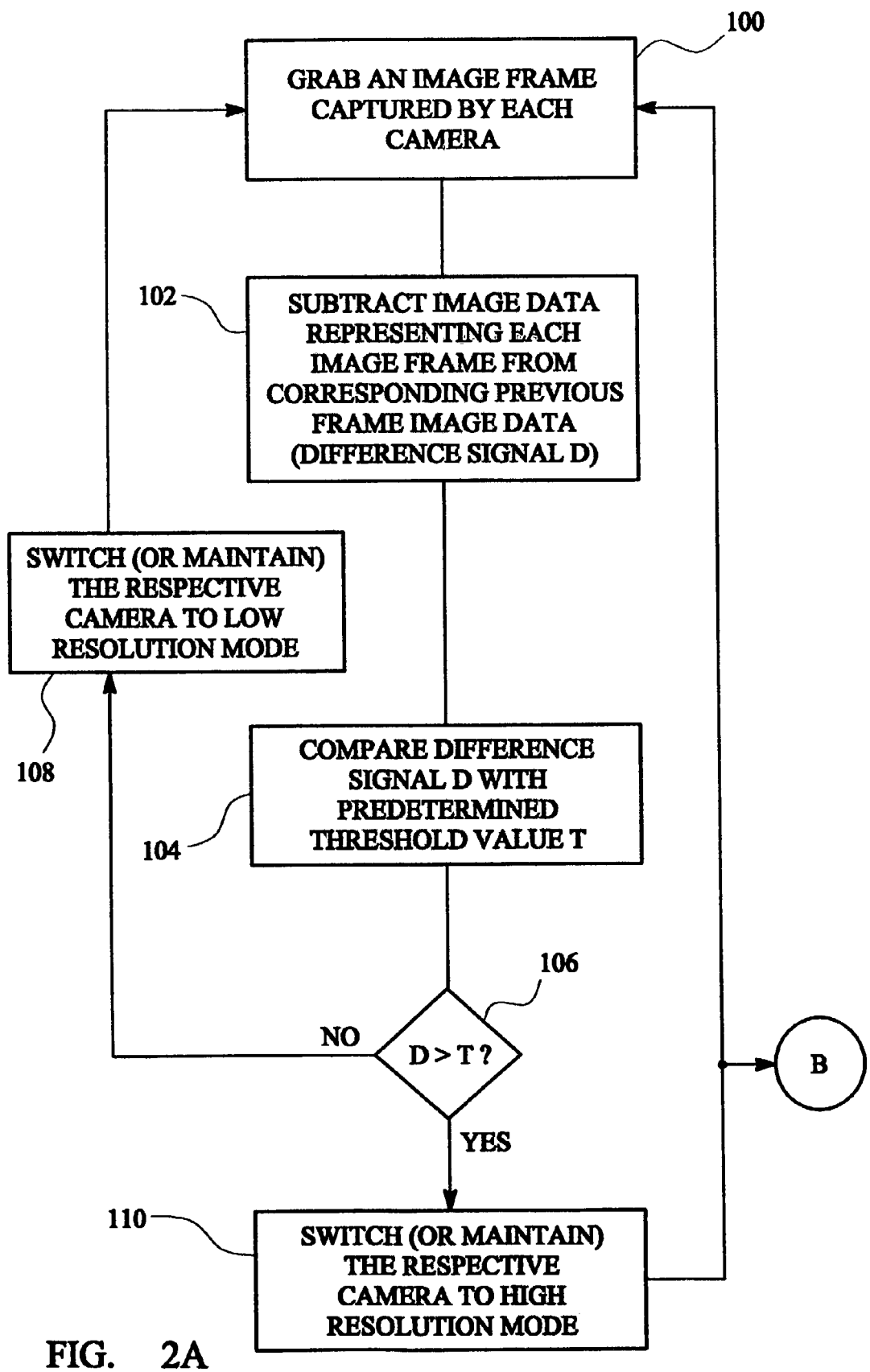
FIG. 2A is a flow diagram illustrating an exemplary method of operation of the motion detection apparatus included in the control apparatus illustrated in FIG. 1.

Referring to FIG. 2A of the drawings, a flow diagram of an exemplary method of operation of the motion detection apparatus 18 is illustrated. At step 100, the motion detection apparatus 18 receives or grabs the latest image frame captured by each video camera 10. At step 102, image data representative of the latest image frame from each camera 10 is subtracted from image data representative of the previous image frame received from the same video camera 10, to produce a difference signal D.

At step 104, the difference signal D is compared with a predetermined threshold value T. It will be appreciated that the value of the difference signal D is substantially representative of the amount by which the content of adjacent image frames differs. Thus, if no activity is occurring within the field of view of a camera, D for that camera should ideally be substantially zero. However, to allow for circumstances such as slight camera shake or noise within the transmitted image data, a predetermined threshold value is set so that values of D slightly above zero will not be interpreted as being indicative of motion or activity occurring within the field of view of the respective camera.

Thus, D for each frame is compared with T and if D is determined to be less than T (at 106), indicating that no motion or activity is currently occurring within the field of view of a camera 10, the mode of that camera is switched to, or maintained in, the low resolution mode (it step 108) and the motion detection apparatus 18 returns to step 100. If, however, D is determined to be greater than T (at 106), indicating the presence of activity or motion within the field of view of a camera 10, the mode of that camera is switched to, or maintained in, the high resolution mode (at step 110). The motion detection apparatus 18 then returns to step 100 (to continue to monitor for activity within the fields of view of the video cameras 10), and also triggers operation of the tracking apparatus 20 for the camera(s) within whose fields of view activity has been detected.

Figure 2B:
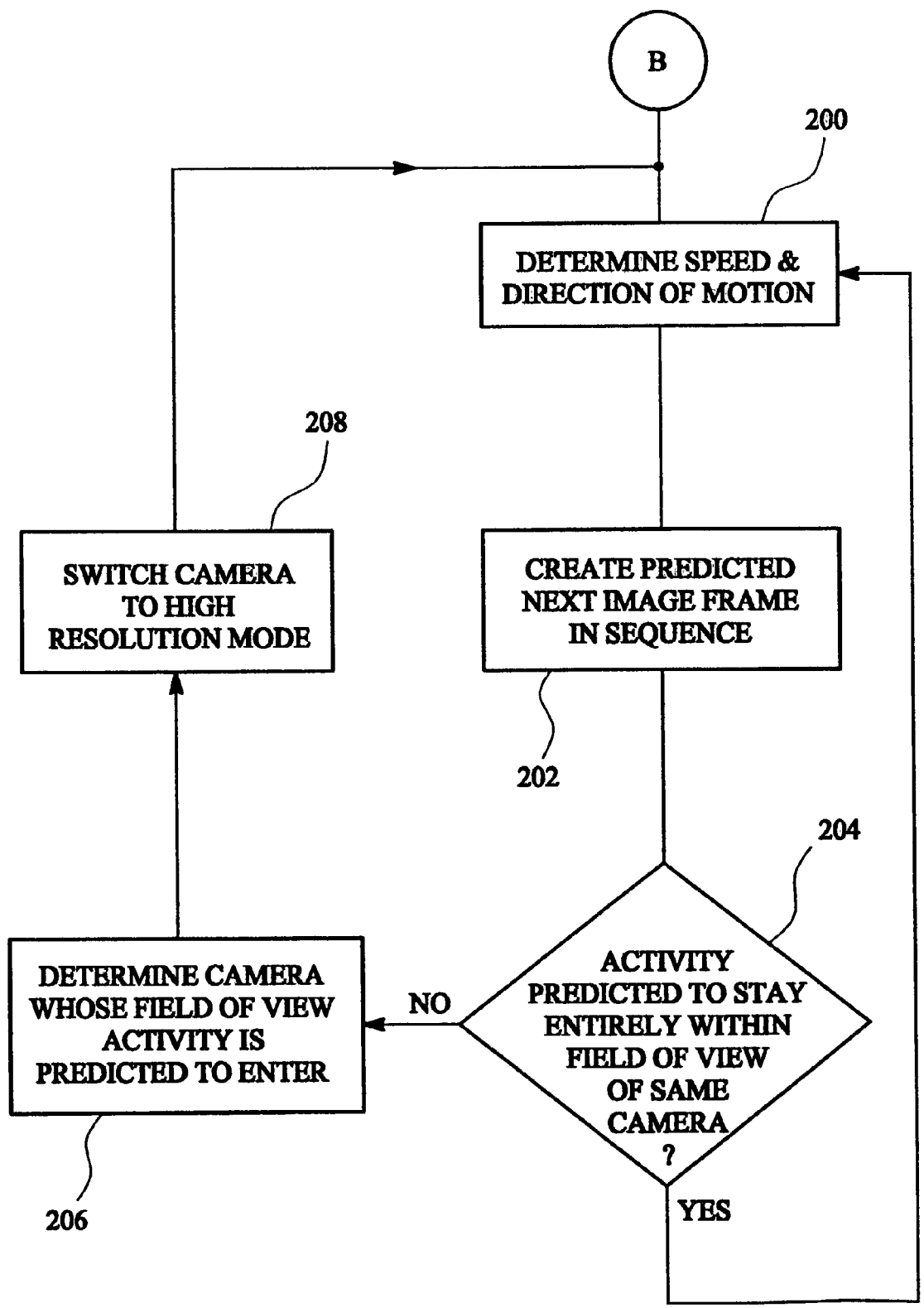
FIG. 2B is a flow diagram illustrating an exemplary method of operation of the tracking apparatus included in the control apparatus illustrated in FIG. 1.

Referring to FIG. 2B of the drawings, a flow diagram of an exemplary method of operation of the tracking apparatus 20 is illustrated. At step 200, the tracking apparatus 20 determines, from analysis of two or more adjacent frames in a sequence captured by the camera 10 in question, the speed and direction of motion. Using this information, it creates a predicted next image frame in the sequence (at step 202). Using its pre-programmed knowledge of the video cameras 10 in the system and their respective fields of view, it determines from the predicted image frame whether or not the motion or activity is predicted to remain entirely within the field of view of the video camera 10 in question. If so, the operation of the tracking apparatus 20 simply returns (at 204) to step 200. If not, the tracking apparatus 20 identifies the camera 10 whose field of view the activity is predicted to enter (at step 206) and switches that camera to (or maintains it in) the high resolution mode, at step 208. The operation of the tracking apparatus 20 then returns to step 200.

Thus the present invention, in general, provides a system which is capable of running a plurality of image capture devices, in for example a surveillance system, in a plurality of different modes so as to minimise power consumption, storage consumption and transmission bandwidth requirements, without significantly degrading the overall effectiveness of the system. Further, the present invention enables the allocation of multi-camera bandwidth appropriately among the video cameras in the surveillance system, according to detected and predicted activity within the fields of view of the cameras.

In the foregoing specification, the invention has been described with reference to specific exemplary embodiments thereof. It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

The invention claimed is:

1. Control apparatus for receiving outputs from and controlling the operation of a plurality of image capture devices, at least some of said image capture devices being arranged to operate at any time in only one of at least two modes, wherein a first mode is a high resolution mode in which the image capture devices transmit high resolution images captured within their field of view and a second mode is a low resolution mode in which the image capture devices transmit low resolution images captured within their field of view the transmission bandwidth required to accommodate the outputs of image capture devices operating in the second mode being substantially less than that required to accommodate the outputs of image capture devices operating in the first mode, wherein all of the image capture devices are arranged, in use, to continuously transmit captured image data to the control apparatus, the control apparatus comprising monitoring apparatus for monitoring the outputs from one or more of said plurality of image capture devices, detection apparatus for detecting activity within the field of view of at least one of said image capture devices, and switching apparatus for switching or maintaining the operating mode of the image capture device within whose field of view activity is detected to the first operating mode, the image capture devices having fields of view within which no activity is taking place being arranged or caused to operate in said second operating mode.

2. Control apparatus according to claim 1, further comprising tracking apparatus for tracking the progress of said activity so as to determine when the occurrence of said activity has or will exit the field of view of said at least one image capture device, and prediction means for predicting which image capture devices field of view said activity will subsequently enter.

3. Control apparatus according to claim 1, comprising a central control unit for controlling the operation of said plurality of image capture devices.

4. Control apparatus according to claim 1, comprising a distributed control arrangement, local to each of a plurality of image capture devices, comprising a transmitter for transmitting a signal from a first image capture device operating in said first operating mode to a second image capture device in whose field of view activity is detected or predicted to take place to cause said second image capture device to switch from said second to said first operating mode.

5. Control apparatus according to claim 1, arranged to control the image capture devices such that they normally operate in a relatively low resolution, low frame rate or monochrome mode, and only switch the mode of an image capture device to high resolution, high frame rate or color operation in the event that activity is detected within their field of view.

6. Control apparatus according to claim 1, including an adjustor for controlling the orientation and/or magnification of the field of view of an image capture device according to the determined or predicted location of said activity.

7. Control apparatus according to claim 1, including data representative of the arrangement of the image capture devices relative to each other.

8. Control apparatus according to claim 1, arranged to trigger an alarm or other type of alert mechanism in the event that an activity is detected within a monitored area and/or if such an activity continues for more than a predetermined period of time.

9. Control apparatus according to claim 1, wherein the control apparatus is in the form of an ethernet arrangement (or the like).

10. Control apparatus for receiving outputs from and controlling the operation of a plurality of image capture devices, at least some of said image capture devices being arranged to operate in one of at least two modes, wherein a first mode is a high resolution mode in which the image capture devices transmit high resolution images captured within their field of view and a second mode is a low resolution mode in which the image capture devices transmit low resolution images captured within their field of view the transmission bandwidth required to accommodate the outputs of image capture devices operating in the second mode being substantially less than that required to accommodate the outputs of image capture devices operating in the first mode, the control apparatus comprising monitoring apparatus for monitoring the outputs from one or more of said plurality of image capture devices, detection apparatus for detecting activity within the field of view of at least one of said image capture devices, tracking apparatus for tracking the progress of said activities so as to determine when the occurrence of said activity has or will exit the field of view of said at least one image capture device, prediction apparatus for predicting which image capture devices field of view said activity will subsequently enter, and switching apparatus for switching or maintaining the operating mode of the image capture device within whose field of view activity is detected or predicted to the first operating mode, the image capture devices having fields of view within which no activity is detected or predicted being arranged or caused to operate in said second operating mode.

11. Control apparatus according to claim 10, arranged to control the image capture devices such that they are normally "off" (second operating mode) and only switch the mode of an image capture device to "on" (first operating mode) in the event that activity is detected or predicted within its field of view.

12. Control apparatus according to claim 10, wherein all of the image capture devices are arranged to continuously transmit captured image data to the control apparatus.

13. A method of controlling the operation of a plurality of image capture devices, at least some of said image capture devices being arranged to operate at any time in only one of at least two modes, wherein a first mode is a high resolution mode in which the image capture devices transmit high resolution images captured within their field of view and a second mode is a low resolution mode in which the image capture devices transmit low resolution images captured within their field of view the transmission bandwidth required to accommodate the outputs of image capture devices in the second mode being substantially less than that required to operate image capture devices in the first mode, the method comprising the steps of providing monitoring apparatus for monitoring the outputs from said plurality of image capture devices, continuously transmitting captured image data from all of said image capture devices to said monitoring apparatus, detecting activity within the field of view of at least one of said image capture devices, and switching or maintaining the operating mode of the image capture device within whose field of view activity is detected to the first operating mode, the image capture devices having fields of view within which no activity is taking place being arranged or caused to operate in said second operating mode.

14. A method according to claim 13, including the step of triggering an alarm or other type of alert mechanism in the event that an activity is detected within a monitored area and/or of such an activity continues for more than a predetermined period of time.

15. A method of controlling the operation of a plurality of image capture devices, at least some of said image capture devices being arranged to operate in one of at least two modes, wherein a first mode is a high resolution mode in which the image capture devices transmit high resolution images captured within their field of view and a second mode is a low resolution mode in which the image capture devices transmit low resolution images captured within their field of view the transmission bandwidth required to accommodate the outputs of image capture devices operating in the second mode being substantially less than that required to accommodate the outputs of image capture devices operating in the first mode, the method comprising the steps of monitoring the outputs from said plurality of image capture devices, detecting activity within the field of view of at least one of said image capture devices, tracking the progress of said activity so as to determine when the occurrence of said activity has or will exit the field of view of said at least one image capture device, predicting which image capture devices field of view said activity will subsequently enter, and switching or maintaining the operating mode of the image capture devices within whose field of view activity is detected or predicted to the first operating mode, the image capture devices having fields of view within which no activity is detected or predicted being arranged or caused to operate in said second operating mode.

16. A method according to claim 15, including the step of controlling the image capture devices such that they are normally "off" or operate in a relatively low resolution, low frame rate or monochrome mode, and switching an image capture device "on" or switching its mode to high resolution, high frame rate, or color operation in the event that activity is detected within their field of view.

* * * * *